United States Patent
Joong et al.

(10) Patent No.: US 6,623,255 B2
(45) Date of Patent: Sep. 23, 2003

(54) FLUID TRANSFER APPARATUS

(75) Inventors: Kim Houng Joong, Hitachi (JP); Kohji Maki, Hitachi (JP); Taizou Miyazaki, Hitachi (JP); Tomoyuki Hanyu, Hitachi (JP); Ryouichi Naganuma, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,679

(22) Filed: Feb. 26, 2001

(65) Prior Publication Data
US 2003/0059320 A1 Mar. 27, 2003

(30) Foreign Application Priority Data

Nov. 2, 2000 (JP) ........................................ 2000-340368

(51) Int. Cl.[7] ................................................ F04B 17/00
(52) U.S. Cl. ........................ 417/411; 417/417; 417/416; 417/481
(58) Field of Search ................................. 417/411, 415, 417/416, 417, 481

(56) References Cited

U.S. PATENT DOCUMENTS

| | | | | |
|---|---|---|---|---|
| 3,292,065 A | * | 12/1966 | Fredrickson | 318/135 |
| 3,309,067 A | * | 3/1967 | Brewster | 417/411 |
| 4,067,667 A | * | 1/1978 | White | 417/416 |
| 4,518,317 A | * | 5/1985 | Inoue | 417/417 |
| 5,831,353 A | * | 11/1998 | Bolding et al. | 417/417 |
| 6,199,381 B1 | * | 3/2001 | Unger et al. | 91/1 |

FOREIGN PATENT DOCUMENTS

JP        10174418        4/1996        ............... 417/417

OTHER PUBLICATIONS

English translation of U.S. patent application No. 09/959615 which is a 371 of PCT/JP00/02808 filed Apr. 27, 2000.

* cited by examiner

*Primary Examiner*—Cheryl J. Tyler
(74) *Attorney, Agent, or Firm*—Antonelli, Terry, Stout & Kraus, LLP (57) ABSTRACT

A fluid transfer apparatus utilizes a linear motor including a movable element in which magnetic poles are provided at a predetermined pitch along a moving direction, magnetic pole teeth provided in upper and lower portions of the movable element at a predetermined pitch along a moving direction of the movable element and so as to oppose to each other via the movable element, and a coil, wherein adjacent magnetic pole teeth and opposing magnetic pole teeth among the magnetic pole teeth form different poles.

6 Claims, 11 Drawing Sheets

FLUID TRANSFER APPARATUS

BACKGROUND OF THE INVENTION

1. Field of the Invention

The present invention relates to a fluid transfer apparatus, and more particularly to a fluid transfer apparatus which performs an operation by oscillating a piston. In this case, the fluid transfer apparatus is defined as an apparatus for transferring a fluid, however, includes, for example, a compressor, a pump and the like.

2. Description of the Prior Art

In a conventional fluid transfer apparatus, in the case of performing a fluid transfer in accordance with an oscillating operation using a motor, it is considered that the motor employs various structures. However, a linear motor corresponding to one of the conventional motors employs a structure in which a rotary machine is cut and opened so as to be driven in a linear manner.

In the conventional fluid transfer apparatus having the linear motor, since the linear motor is structured such that the rotary machine is cut and opened so as to be driven in a linear manner, a leakage flux between an armature and a movable element is much, and a motor efficiency is bad, so that there is a problem that it is hard to put the linear motor into practice in order to apply the linear motor to the fluid transfer apparatus requiring a high output power. Further, since a magnetic attraction force is applied to a portion between the armature and the movable element in one direction, a great load is applied to a support mechanism of the movable element, so that there is a problem that a strain is generated in the structure and various problems are generated, whereby it is hard to put the structure into practice.

SUMMARY OF THE INVENTION

In accordance with the present invention, for example, in order to make an efficiency of the conventional fluid transfer apparatus high, the structure is made such as to reduce a leakage of a magnetic flux passing through the portion between the armature and the movable element so as to reduce a magnetic attraction force generated between the armature and the movable element. An object of the present invention is to provide a fluid transfer apparatus which can improve a motor efficiency and make an output high.

In accordance with one aspect of the present invention, there is provided a fluid transfer apparatus transferring a working fluid in accordance with an oscillating movement, having a motor, wherein the motor of the fluid transfer apparatus comprises a movable element in which magnetic poles are provided at a predetermined pitch along a moving direction and to which a piston is attached, magnetic pole teeth provided in upper and lower portions of the movable element at a predetermined pitch along a moving direction of the movable element and so as to oppose to each other via the movable element, and a coil exciting so that adjacent magnetic pole teeth and opposing magnetic pole teeth among the magnetic pole teeth form different poles, wherein a linear motor is constituted by the movable element, the magnetic pole teeth and the coil, wherein the movable element is oscillated by exciting the coil in accordance with a predetermined control circuit, and wherein a fluid transfer is performed by the piston in a process of the oscillating movement.

Further, in accordance with another aspect of the present invention, there is provided a fluid transfer apparatus using a piston structured such that an oscillating stroke of the piston is changeable.

Further, in accordance with the other aspect of the present invention, there is provided a fluid transfer apparatus using a piston structured such that the fluid transfer apparatus stops the piston at a predetermined position when a drive power source stops supplying.

Further, in accordance with the other aspect of the present invention, there is provided a fluid transfer apparatus using a piston structured such that the fluid transfer apparatus uses a linear motor as a drive source, and the linear motor uses pistons in both sides of a movable element.

Further, in accordance with the other aspect of the present invention, there is provided a fluid transfer apparatus using a piston structured such that linear motors are used in both sides of the piston.

Further, in accordance with the other aspect of the present invention, there is provided a fluid transfer apparatus using a piston, further comprising a resonance spring.

Further, in accordance with the other aspect of the present invention, there is provided a fluid transfer apparatus using a piston structured such that a casing is formed in a double construction, thereby achieving a cooling function due to a fluid transfer.

Further, in accordance with the other aspect of the present invention, there is provided a fluid transfer apparatus, further comprising a closed loop control system constituted by a linear motor, a sensor detecting a relative displacement between the armature and the movable element and a magnetic pole, a control portion feeding back a signal of the sensor, and a power drive portion.

Further, in accordance with the other aspect of the present invention, there is provided a fluid transfer apparatus, further comprising an open loop control system constituted by a linear motor, a control portion and a power drive portion.

Further, in accordance with the other aspect of the present invention, there is provided a fluid transfer apparatus, further comprising a control system constituted by a linear motor, a power drive portion, and a control portion including estimating means for detecting an induced voltage of the linear motor and estimating a relative magnetic pole position between the armature and the movable element on the basis of the voltage detected value.

Further, in accordance with the other aspect of the present invention, there is provided a fluid transfer apparatus, further comprising a control system comprising a linear motor, a power drive portion, and a control portion including estimating means for detecting an electric current flowing through the linear motor and estimating a relative magnetic pole position between the armature and the movable element on the basis of the current detected value.

Further, in accordance with the other aspect of the present invention, there is provided a fluid transfer apparatus structured such that a plurality of armatures of the linear motor are arranged and a pitch between magnetic pole teeth of the adjacent different armatures is set to (k·P+P/M) {(k=0, 1, 2, . . . ), (M=2, 3, 4, . . . )} {in which k is a number freely selected in a range that the adjacent armatures can be arranged, M is a number of phase of the motor} when the pole pitch is set to P.

Further, in accordance with the other aspect of the present invention, there is provided a fluid transfer apparatus, further comprising a switching function that any one of a battery and an external power source is employed as a power source of the fluid transfer apparatus.

Further, it is desirable to make the structure such that the linear motor is a linear motor comprising an armature and a movable element capable of moving relative to the armature, the linear motor further has one magnetic pole teeth rows which are magnetically connected to one magnetic pole of the armature and are arranged so as to be separated into a first stage and a second stage in a substantially vertical direction to a moving direction of the movable element, and another magnetic pole teeth rows which are magnetically connected to another magnetic pole of the movable element and are arranged so as to be separated into a first stage and a second stage in a substantially vertical direction to the moving direction of the movable element, the first stage of magnetic pole teeth in the one magnetic pole teeth rows and the first stage of magnetic pole teeth in the another magnetic pole teeth row are alternately arranged with respect to the moving direction of the movable element, the second stage of magnetic pole teeth in the one magnetic pole teeth rows and the second stage of magnetic pole teeth in the another magnetic pole teeth row are alternately arranged with respect to the moving direction of the movable element, and the movable element is arranged between the one and another first stage of magnetic pole teeth rows and the one and another second stage of magnetic pole teeth rows.

Further, in accordance with the other aspect of the present invention, there is provided a fluid transfer apparatus using a piston structured such that the fluid transfer apparatus uses a linear motor as a drive source, and the linear motor is structured such that the stator is supported in a fixed manner and the movable element moves.

Further, in accordance with the other aspect of the present invention, there is provided a fluid transfer apparatus using a piston structured such that the fluid transfer apparatus uses a linear motor as a drive source, and the linear motor is structured such that the movable element is supported in a fixed manner and the stator moves.

The features mentioned above and the other features of the present invention will be described below.

DESCRIPTION OF THE PREFERRED EMBODIMENTS

A description will be given below of embodiments in accordance with the present invention with reference to the accompanying drawings. Further, in the drawings, the constituting elements denoted by the same reference numerals are the same elements or the corresponding elements.

Figure 1:
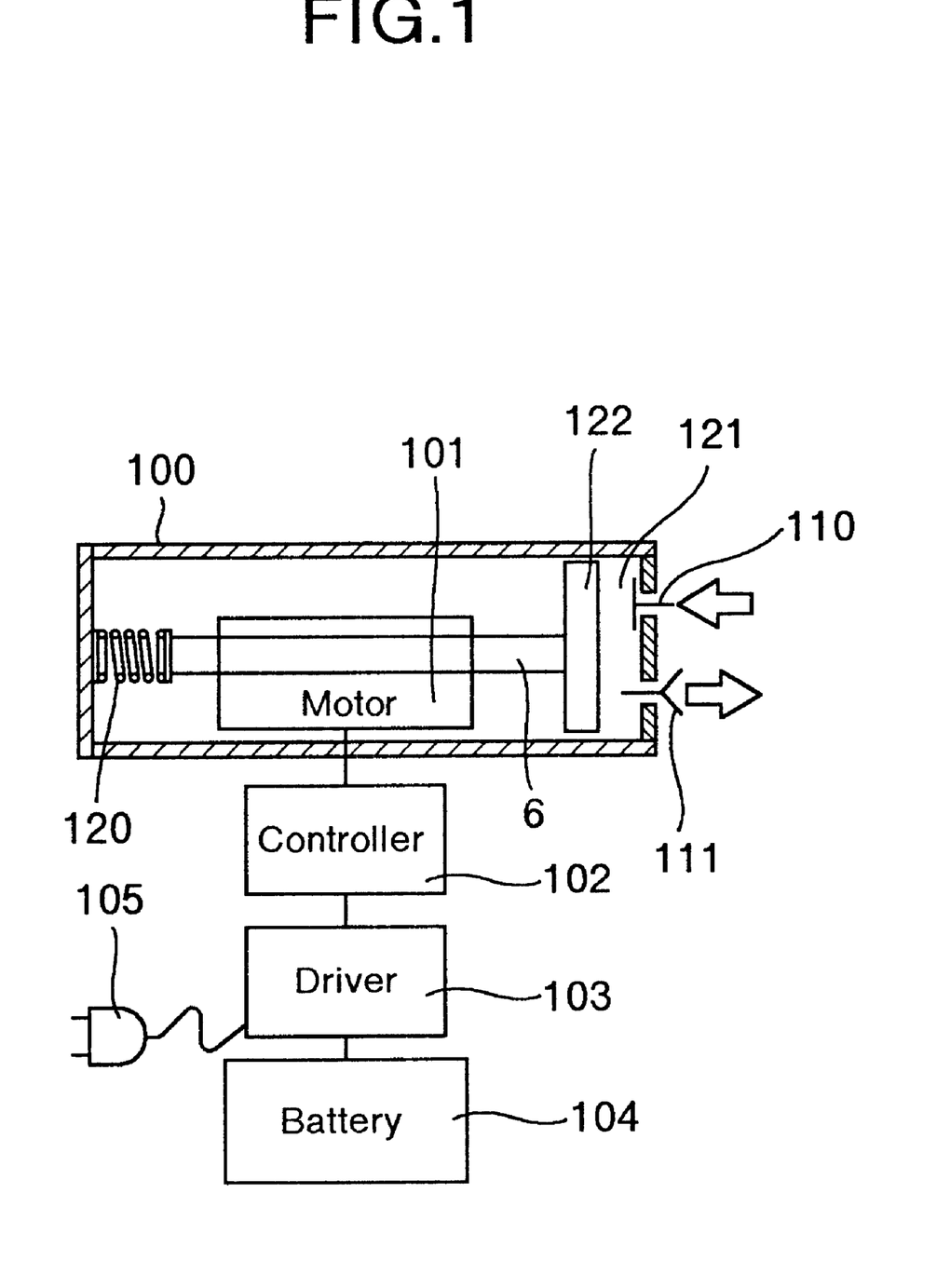
FIG. 1 is a block diagram showing a basic structure of a fluid transfer apparatus with a linear motor in accordance with an embodiment of the present invention.

FIG. 1 is a block diagram of a basic structure of a fluid transfer apparatus having a linear motor. Reference numeral 101 denotes a linear motor constituted by an armature and a movable element mentioned below, reference numeral 100 denotes a casing, reference numeral 102 denotes a controller, reference numeral 103 denotes a driver, reference numeral 104 denotes a battery, reference numeral 105 denotes a power source code, reference numeral 6 denotes a movable element, reference numeral 120 denotes a spring, reference numeral 110 denotes a suction valve, reference numeral 111 denotes a discharge valve, reference numeral 121 denotes a compression chamber, and reference numeral 122 denotes a piston attached to a front end of the movable element 6.

One path opening and closing type valve can be employed for the suction valve 110, the discharge valve 111 and the like. Further, it is a matter of course that the compression chamber 121 constituted by a moving stroke portion of the piston 122 or the like is sealed.

Further, the fluid transfer apparatus is provided with a switching function (not shown) capable of being driven by both of a battery and an external power source. Further, the battery 104 and the power source code 105 can be attached and detached as occasion demands. Further, the controller 102 and the driver 103 may be installed in the casing 100.

The spring 120 is provided in a front end of another movable element to which the piston 122 of the linear motor is not attached, thereby serving a bumper function. Further, an efficiency of the fluid transfer apparatus is increased by utilizing a resonance phenomenon of the spring for an oscillating movement of the movable element 6.

FIGS. 2A, 2B, 3A and 3B show control block diagram using the linear motor in accordance with the present embodiment.

Figure 2A:
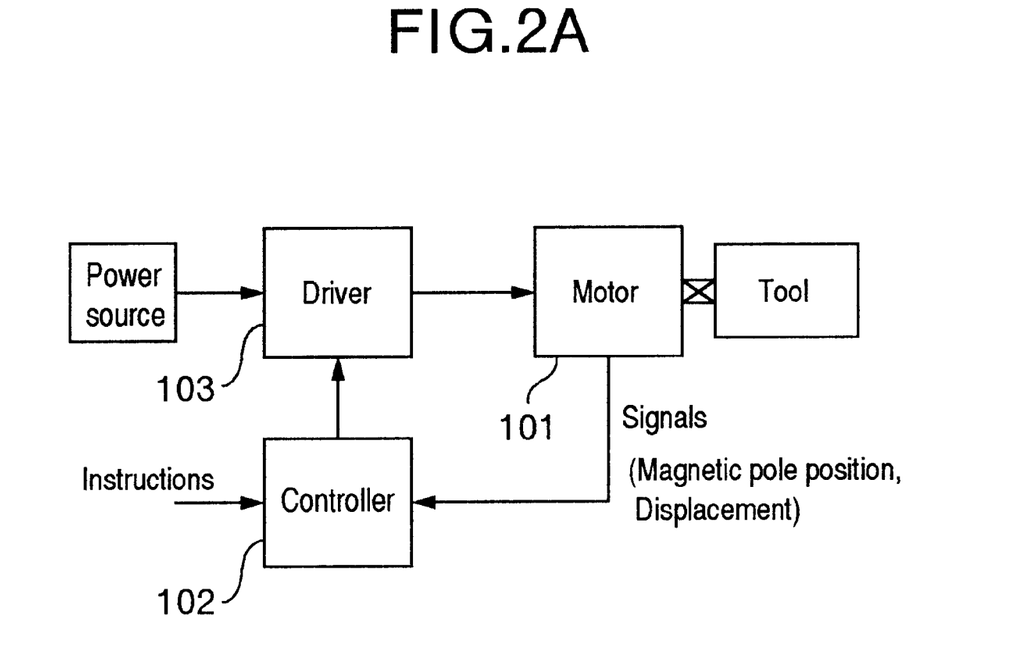
FIGS. 2A and 2B are control block diagrams of an embodiment in accordance with the present invention.

FIG. 2A shows a block diagram constituting a close loop control system comprising a sensor (not shown) detecting a relative displacement between an armature and the movable element in the linear motor 101 and a magnetic pole, the control portion 102 feeding back signals of the sensor and the power drive portion 103.

Figure 2B:
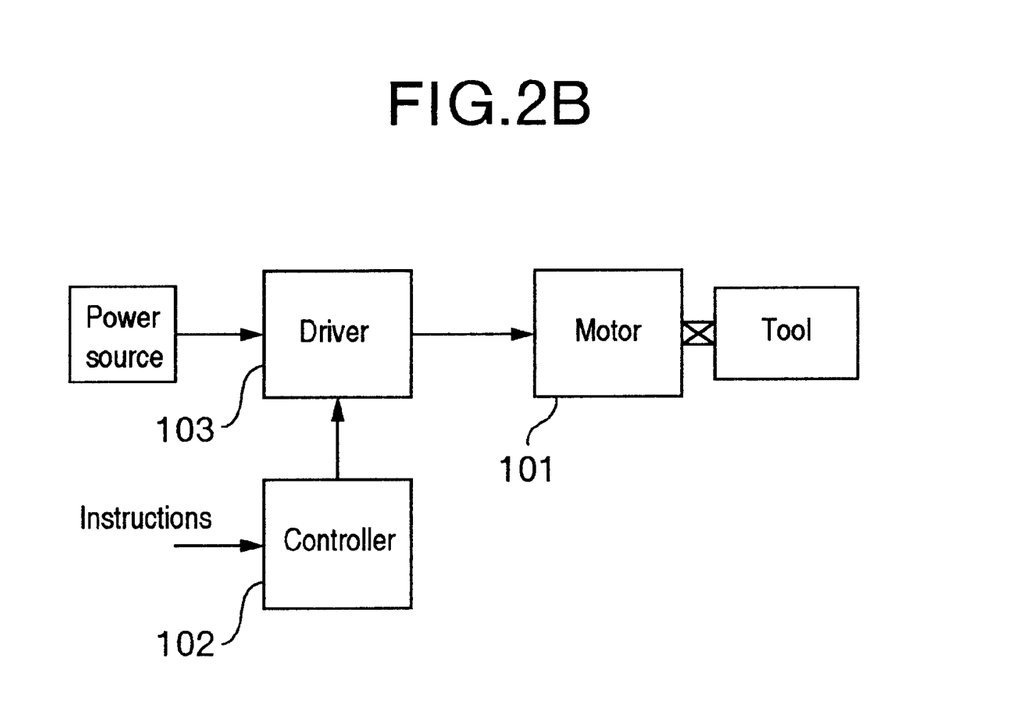

FIG. 2B shows a block diagram constituting an open loop control system comprising the linear motor 101, the control portion 102 and the power drive portion 103.

Figure 3A:
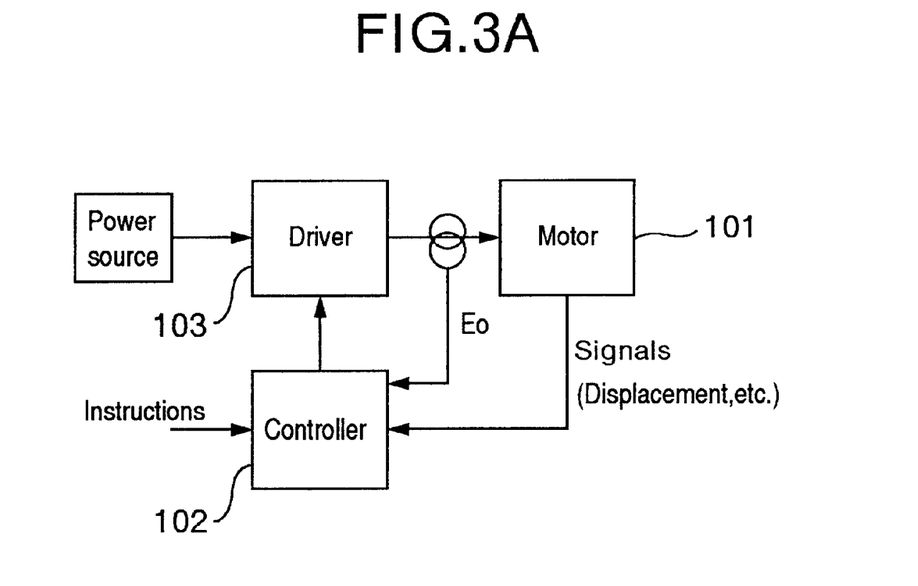
FIGS. 3A and 3B are another control block diagrams in an embodiment in accordance with the present invention.

FIG. 3A shows a block diagram constituting a magnetic pole sensorless control system comprising the linear motor 101, a voltage sensor, the controller 102 and the power drive portion 103. In the present embodiment, an induced voltage Eo generated by the linear motor is read within the controller 102 by using the voltage sensor. A magnetic pole position is estimated from a magnitude of the induced voltage, within the controller 102, and a signal for driving the linear motor is output to the power drive portion 103. In the control system in accordance with the present structure, the linear motor 101 can be stably driven without mounting a magnetic pole position sensor in the linear motor portion 101.

Figure 3B:
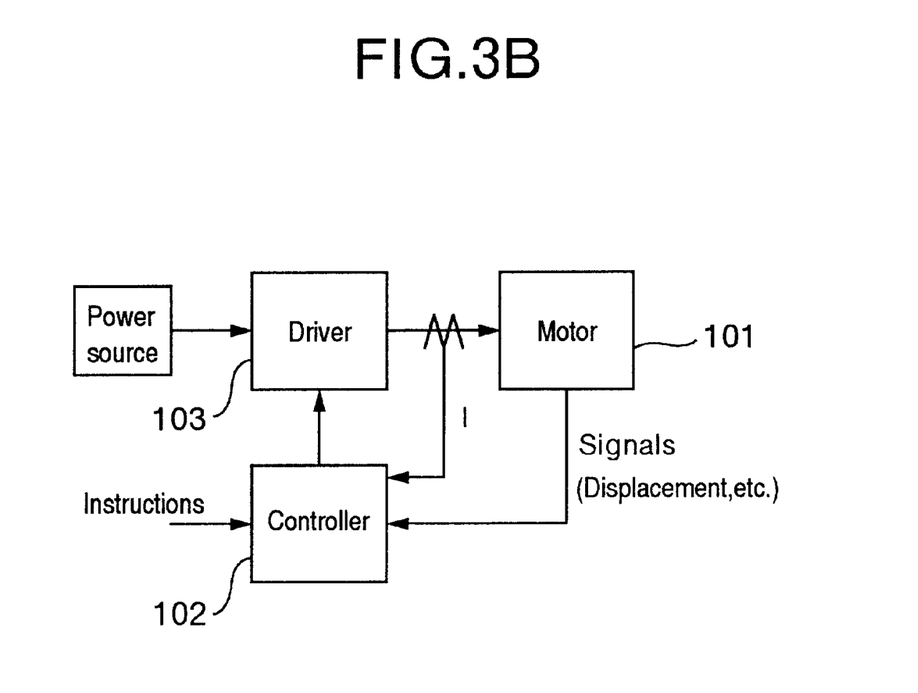

FIG. 3B shows a block diagram constituting a magnetic pole sensorless control system comprising the linear motor 101, a current sensor, the controller 102 and the power drive portion 103. In the present embodiment, an electric current I flowing through the linear motor is read within the controller 102 by using the current sensor. Within the controller 102, the induced voltage of the linear motor is calculated from a voltage applied to the linear motor and a detected current value, whereby the magnetic pole position is estimated and calculated. In the control system in accordance with the present structure, the linear motor can be stably driven without mounting the magnetic pole position sensor to the linear motor portion 101.

Figure 4:
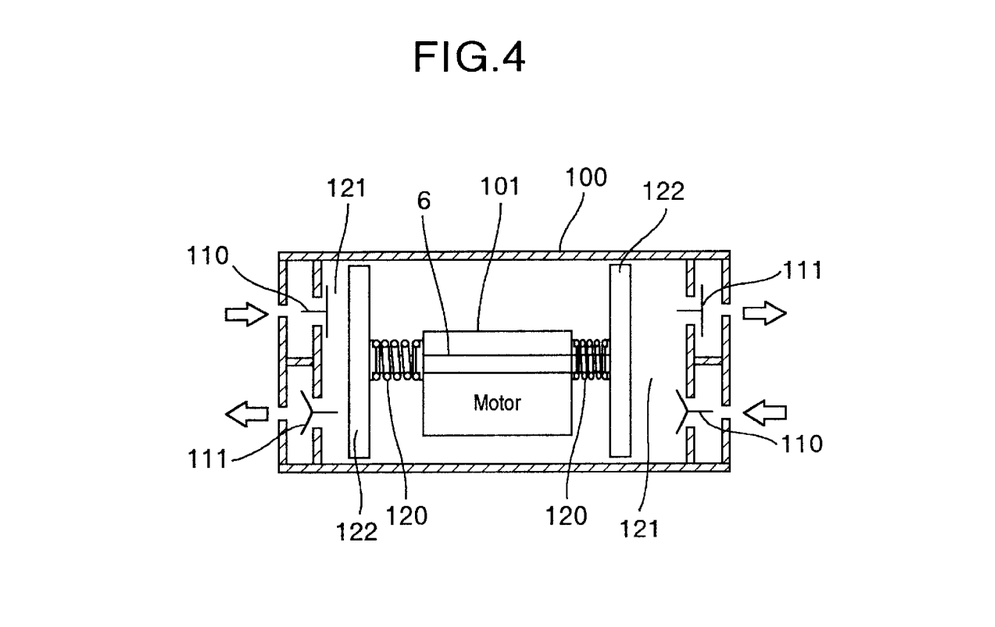
FIG. 4 is a schematic view of a first structure of a linear motor and a piston in accordance with another embodiment of the present invention.

FIG. 4 shows a structure in which an internal structure of the casing 100 shown in FIG. 1 is improved. Of course, the control portion 102, the driver portion 103, the battery 104, the power source code 105 and the like are common constituting elements. FIG. 4 shows another embodiment in accordance with the present invention of the fluid transfer apparatus using the pistons 122 in both sides of the movable element 6 in the linear motor 101. Accordingly, two or more sets of suction and discharge operations can be performed by one linear motor 101. Therefore, there can be obtained an effect of achieving a compact structure.

Figure 5A:
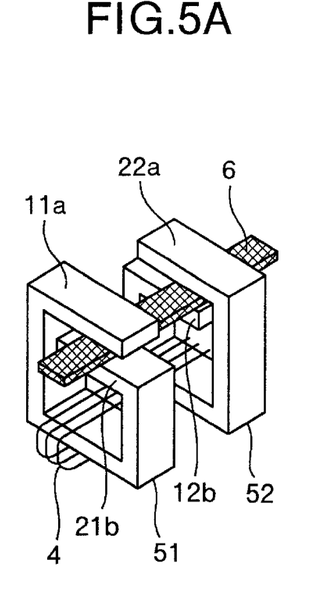
FIGS. 5A and 5B are schematic views of a linear motor used in a fluid transfer apparatus in accordance with the present invention.
Figure 5B:
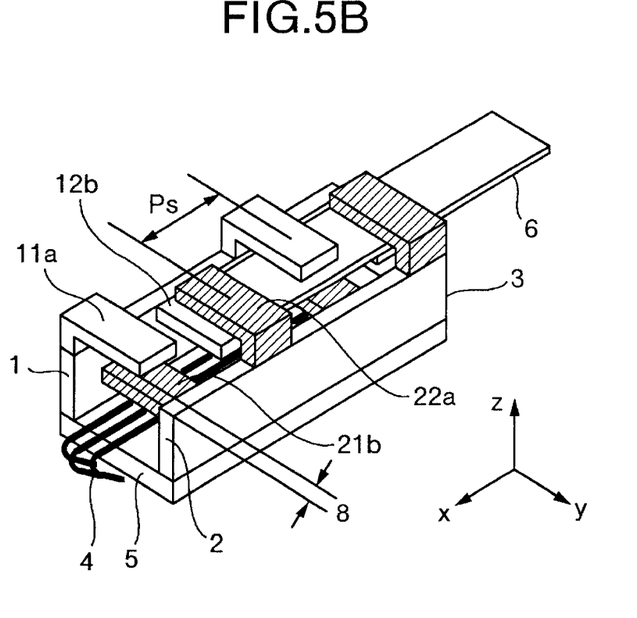

FIGS. 5A and 5B show a schematic structure of the linear motor employed in the fluid transfer apparatus in accordance with the present invention. FIG. 5A is a schematic view of a basic structure of a linear motor in accordance with an embodiment of the present invention, and FIG. 5B shows an example of a schematic structure in which a multiplicity of basic structures mentioned above are employed.

In FIG. 5A, reference numeral 51 denotes an iron core having a first opposing portion, and reference numeral 52 denotes an iron core having a second opposing portion. The iron core 51 and the iron core 52 are structured such that an upper magnetic pole and a lower magnetic pole are alternated. In this case, upper magnetic pole teeth 11a and lower magnetic pole teeth 21b in the iron core 51 are defined as the first opposing portion, and lower magnetic pole teeth 12b and upper magnetic pole teeth 22a in the iron core 52 are defined as the second opposing portion. Accordingly, the armature is structured so that (2n−1)th iron core forms the first opposing portion and (2n)th iron core forms the second opposing portion (in this case, n=1, 2, 3, . . . ). Further, as shown in FIG. 5A, one coil 4 is wound around the iron core 51 and the iron core 52. There is provided a linear motor structured such that the movable element 6 is held between the first opposing portions of the iron core 51, the movable element is held between the second opposing portions of the iron core 52, and the movable element relatively moves with respect to the armature. In this case, the armature is constituted by the iron core and the coil 4, and the movable element is constituted by a permanent magnet, a magnetic body and a nonmagnetic body. Further, the structure is made such that when a fixed gap 8 is provided between the upper magnetic pole teeth and the lower magnetic pole teeth in each of the opposing portions, and the movable element is passed through the gap 8, the movable element is held between the first opposing portions, and the movable element is held between the second opposing portions. In accordance with the structure mentioned above, the armature is formed in a gap between the upper magnetic pole teeth and the lower magnetic pole teeth in each of the opposing portions of the linear motor in accordance with the present embodiment so that the magnetic flux alternately flows vertically between the upper and lower magnetic pole teeth, and the movable element relatively moves through the gap.

Figures 6A, 6B:
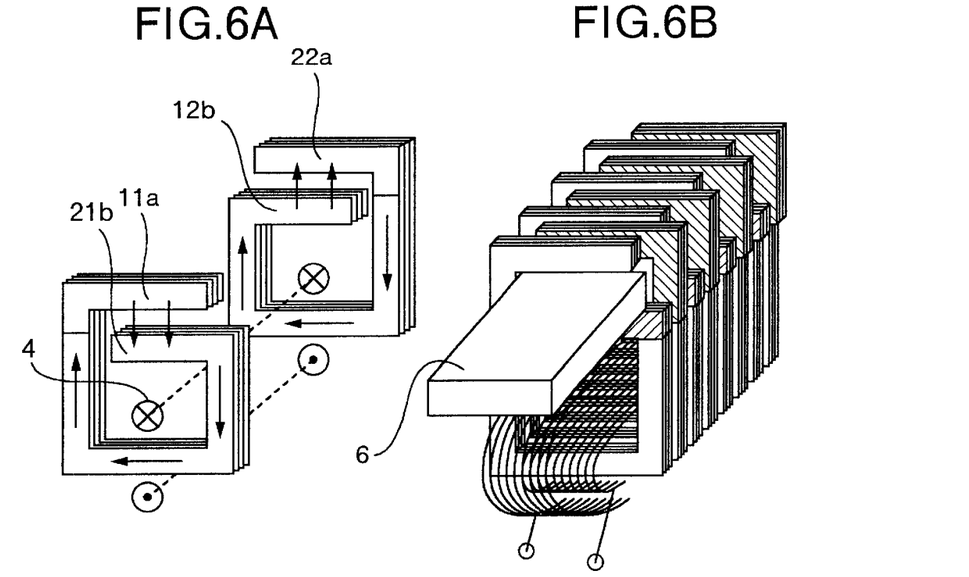
FIG. 6A is a schematic view showing a notion of a magnetic flux flow of a linear motor.
FIG. 6B is a schematic view showing an assembly constructed by laminated steel plates.

FIGS. 6A and 6B show schematic views showing a notion of the magnetic flux flow of the linear motor, and an assembly constructed by laminated steel plates.

When the structure is made in the manner mentioned above, as shown in FIG. 6A, the armature 3 in which the magnetic flux alternately flows in a vertical direction between the upper and lower magnetic pole teeth is formed in the gap between the upper magnetic pole teeth 11a and 22a and the lower magnetic pole teeth 21b and 12b in the respective opposing portions of the armature 3, whereby the movable element 6 relatively moves through the gap.

Further, in the linear motor in accordance with the present embodiment, since an attraction force applied to the movable element 6 and the upper magnetic pole teeth 11a and 22a and an attraction force applied to the movable element 6 and the lower magnetic pole teeth 21b and 12b have substantially the same magnitude and the attraction forces are applied in the opposite directions, a total attraction force becomes small. Accordingly, it is possible to make the attraction force between the magnetic pole teeth of the movable element 6 and the armature 3 small, and it is possible to reduce a load of the supporting mechanism.

In FIG. 6B, the armature 3 is constructed by laminated steel plates, and is structured such that plural sets of first opposing portions and second opposing portions are alternately arranged. Further, the magnetic pole portion having the iron core portion in which the coil 4 of the armature 3 is arranged and the opposing portions between which the movable element 6 is held is separately produced by the laminated steel plates and thereafter assembled.

Figure 7A:
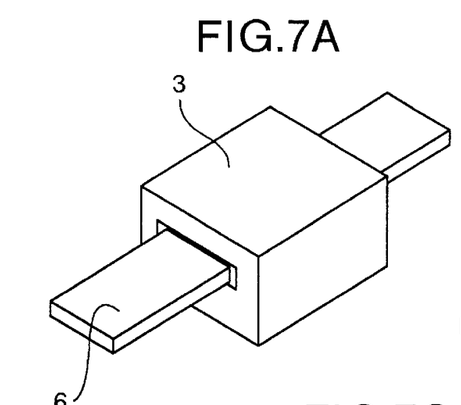
FIGS. 7A, 7B and 7C are perspective views showing an embodiment of a schematic structure of a linear motor in which an armature is molded.
Figure 7B:
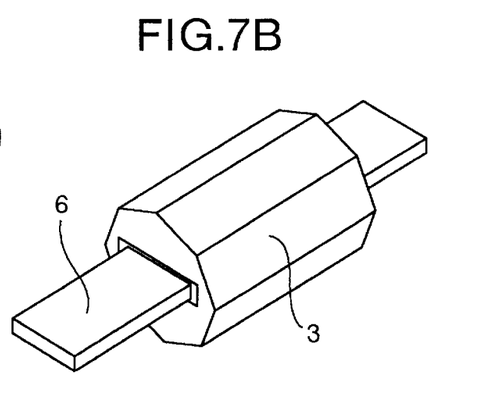
Figure 7C:
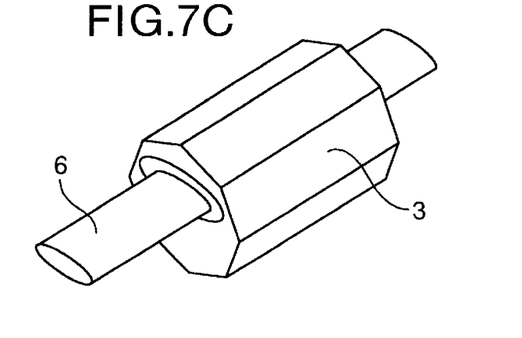
Figure 8:
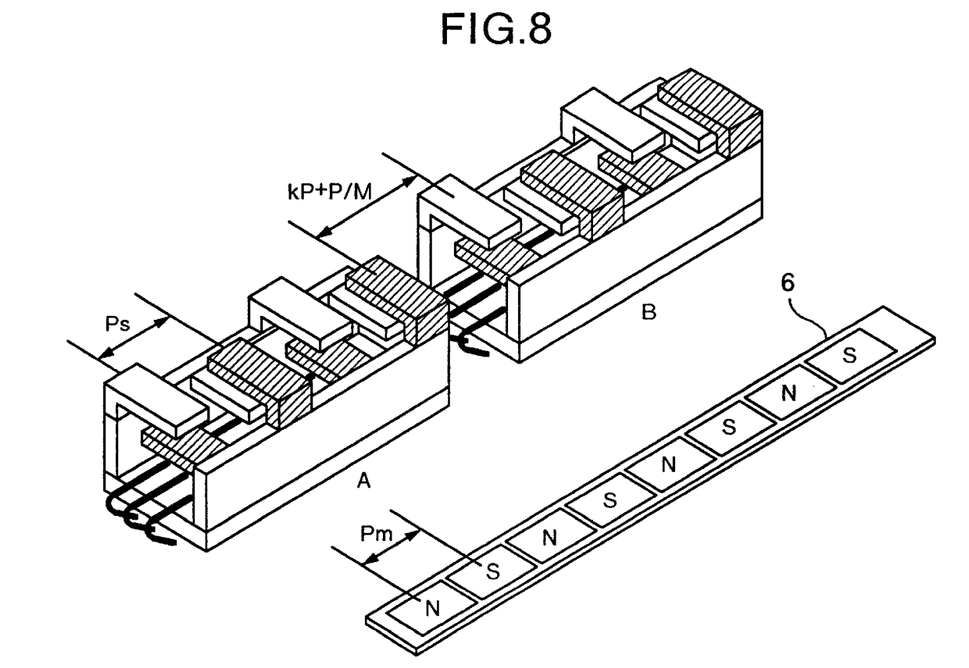
FIG. 8 is a schematic view showing two linear motors arranged in series.
Figure 9:
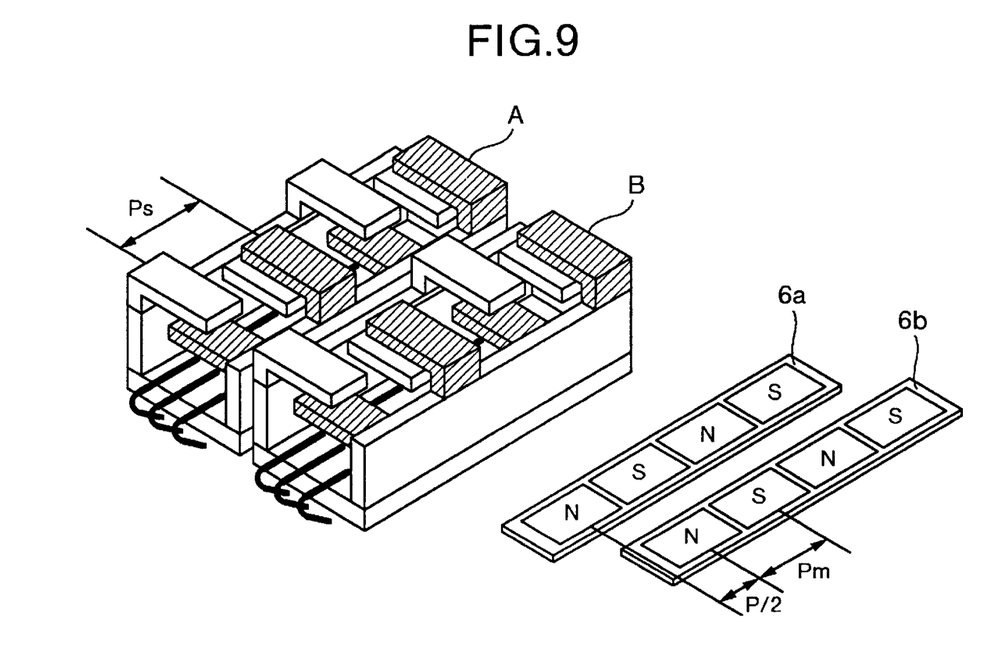
FIG. 9 is a schematic view showing two linear motors arranged in parallel.

FIG. 7 shows an image of molding the armature constructed by the laminated steel plates shown in FIG. 6B. The armature 3 is structured such as to mold so as to include the laminated steel plates, the coil and the support mechanism (not shown). Further, the armature 3 may be structured such that the armatures are arranged in series as shown in FIG. 8 and each of a phase A and a phase B is individually molded, or multi phases may be wholly molded. Further, as shown in FIG. 9, the structure may be made such that armatures are arranged in parallel, and each of the phase A and the phase B is individually molded or multi phases may be wholly molded.

Figure 11:
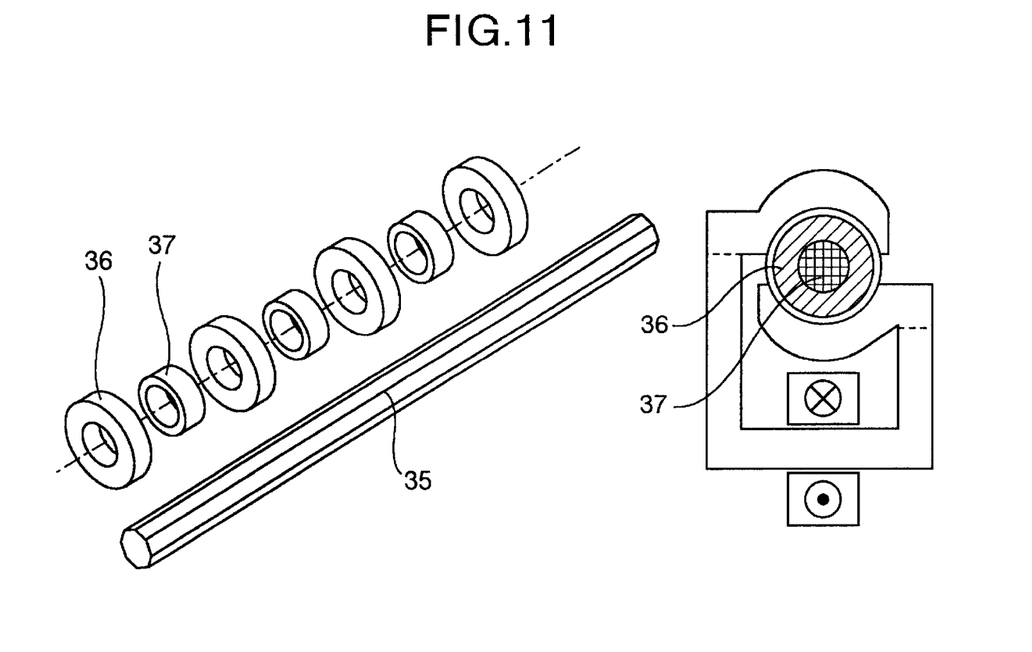
FIG. 11 is a schematic view showing a second embodiment of the movable element.

The armature 3 can be formed in a rectangular shape, a cylindrical shape or the like in correspondence to a shape of the fluid transfer apparatus, and the movable element 6 can be formed in a rectangular shape, a cylindrical shape as shown in FIG. 11 or the like in the same manner.

FIG. 8 shows an embodiment of an arrangement using the linear motor in accordance with the present embodiment.

Figure 13:
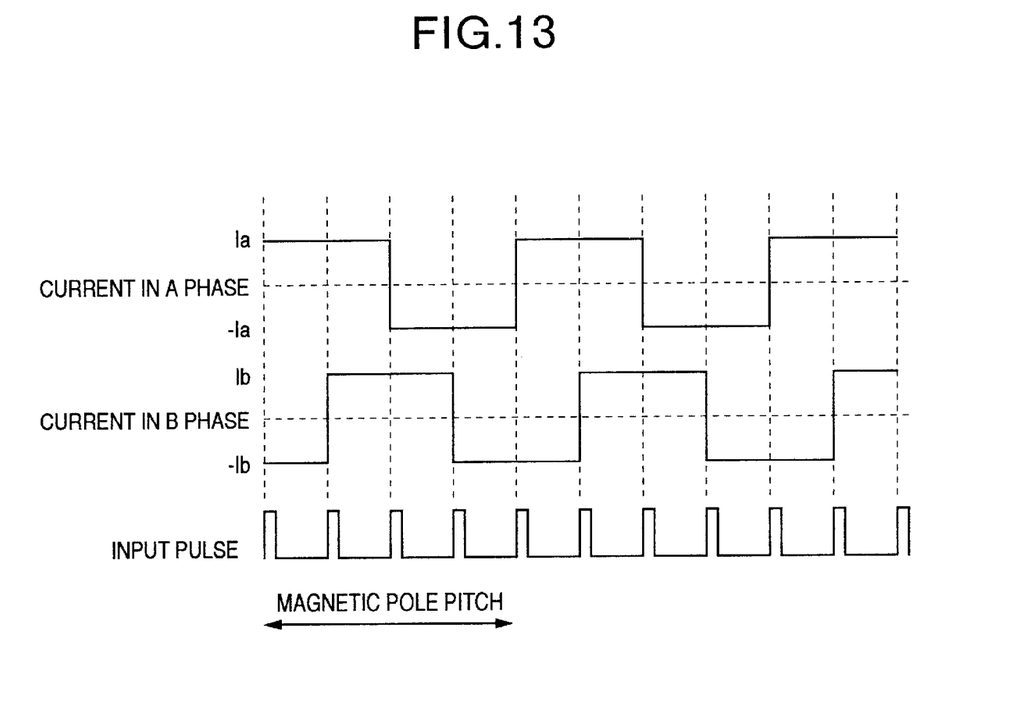
FIG. 13 is a time chart showing an exciting sequence of a two-phase linear motor.

Here, in FIG. 8, there is shown a matter that two armatures are arranged in series. A forward moving magnetic field is generated between the phase A and the phase B by switching an exciting operation with keeping a phase difference of an electric angle 90 degrees, and the movable element 6 relatively moves. FIG. 13 shows an exciting sequence of a two-phase linear motor. A moving mount and a moving speed of the forward and backward moving operation are set in accordance with a required specification condition.

Figure 14:
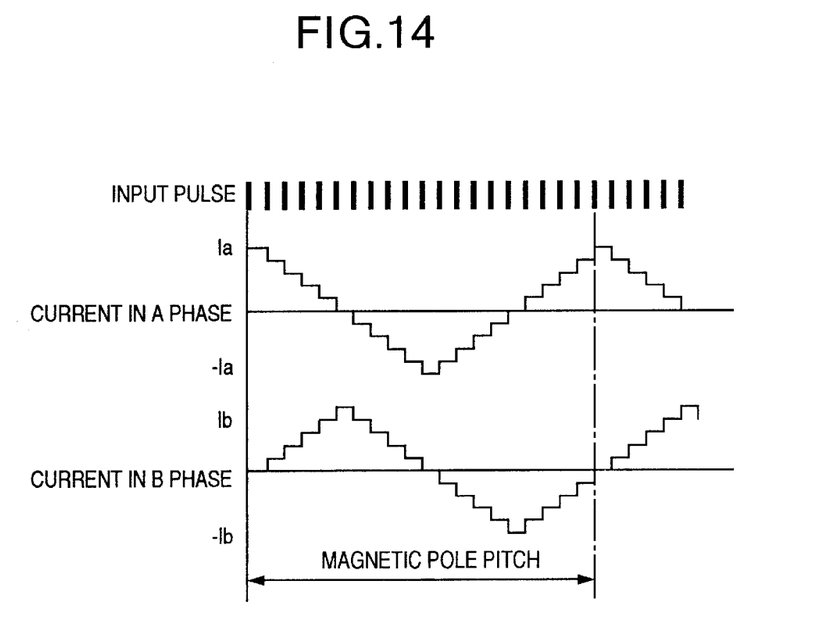
FIG. 14 is a time chart showing another exciting sequence of the two-phase linear motor.
Figure 15:
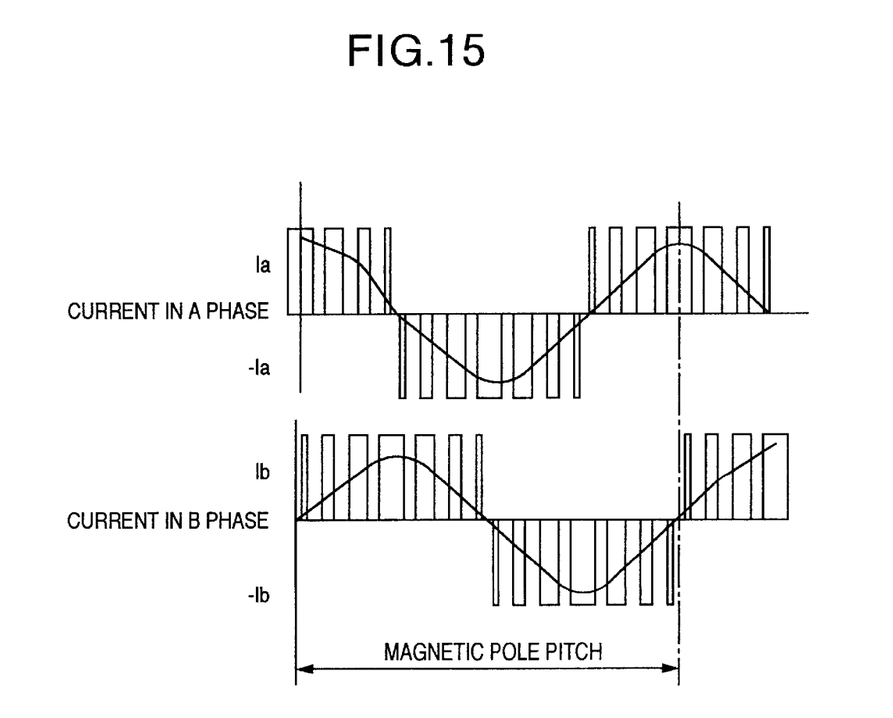
FIG. 15 is a time chart showing the other exciting sequence of the two-phase linear motor.

FIGS. 14 and 15 show another exciting sequence of the two-phase linear motor.

FIG. 14 shows a method of controlling a motor current to a false sine curve so as to drive a step angle of the motor in accordance with a finer step angle. Accordingly, there can be obtained an effect that a sound and a vibration can be reduced.

In accordance with a method shown FIG. 15, since a frequency control and an output voltage control are simultaneously performed by an inverter portion, an output voltage wave shape is pulse width modified so as to be formed in a sine curve. Accordingly, it is possible to remove a low level higher harmonic wave, and it is possible to reduce a propelling force ripple of the motor, so that there is obtained an effect that the sound and the vibration can be reduced.

FIG. 9 shows another embodiment of the arrangement of the linear motor. In FIG. 9, there is shown a structure in which two sets of armature 3 and movable element 6 are arranged in parallel. The same matter can be applied to the case that two armatures 3 are arranged in parallel and two movable elements 6 are integrally formed, and the case that a plurality of armatures 3 are arranged in parallel and a plurality of movable elements 6 are integrally formed.

Here, the description is given of the one-phase and two-phase linear motors as the embodiments in accordance with the present invention, however, the present invention can be used as a multi-phase linear motor, for example, three-phase, four-phase and five-phase linear motors.

When a plurality of armatures 3 of the linear motor are arranged and a pitch between poles is set to P, a pitch between the magnetic pole teeth of the adjacent different armatures 3 is set to satisfy the formula (k·P+P/M) {(k=0, 1, 2, . . . ), (M=2, 3, 4, . . . )} {in which k is a number freely selected among a range where the adjacent armatures 3 can be arranged, and M is a number of phase of the motor}.

Figure 10:
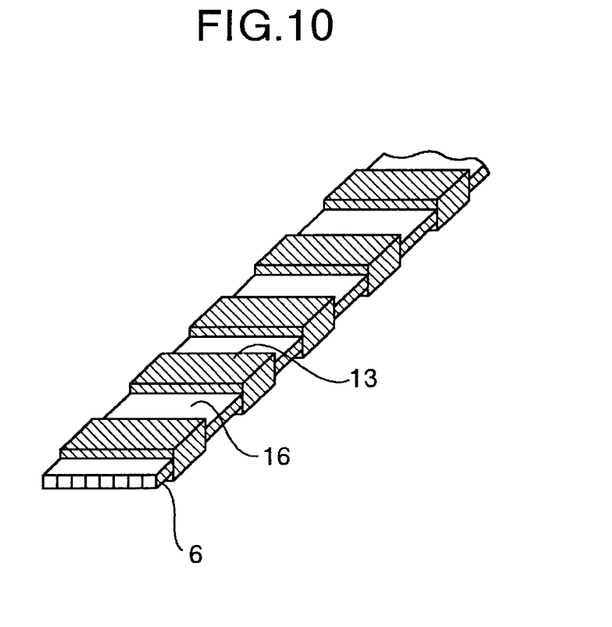
FIG. 10 is a schematic view showing a first embodiment of a movable element.

FIG. 10 shows another embodiment of a flat-shaped movable element in accordance with the present invention. FIG. 11 shows an embodiment in which the flat-shape movable element is formed in a cylindrical movable element.

In FIG. 10, when providing convex magnetic pole teeth 13 on both surfaces of a flat-shaped ferromagnetic substance, a magnetic resistance is changed between the magnetic pole teeth 13 and the magnetic pole in the opposing portion of the armature 3 with respect to a forward moving direction. That is, a magnetic resistance between the convex magnetic pole teeth 13 and the armature 3 is smaller than a magnetic resistance between the ferromagnetic substance flat plate portion 16 and the magnetic pole of the opposing portion in the armature. When utilizing the change of the magnetic resistance, a movable element 6 freely moving can be obtained. In this case, by forming the convex magnetic pole teeth 13 in a ferromagnetic substance and providing a permanent magnet in the flat plate portion 16, a composite type movable element can be obtained. Further, it is possible to combine so that the convex magnetic teeth 13 is formed in a ferromagnetic substrate and the flat plate portion 16 is formed in a nonmagnetic substrate.

In FIG. 11, an operation principle is the same as that of FIG. 10, and the structure is made such that ferromagnetic substrates 36 and nonmagnetic substrates 37 are alternately mounted to an axis 35. Further, a permanent magnet may be employed. In this case, as shown in a right side of FIG. 11, the opposing magnetic pole teeth have a curved shape along a shape of the axis 35.

Figure 12:
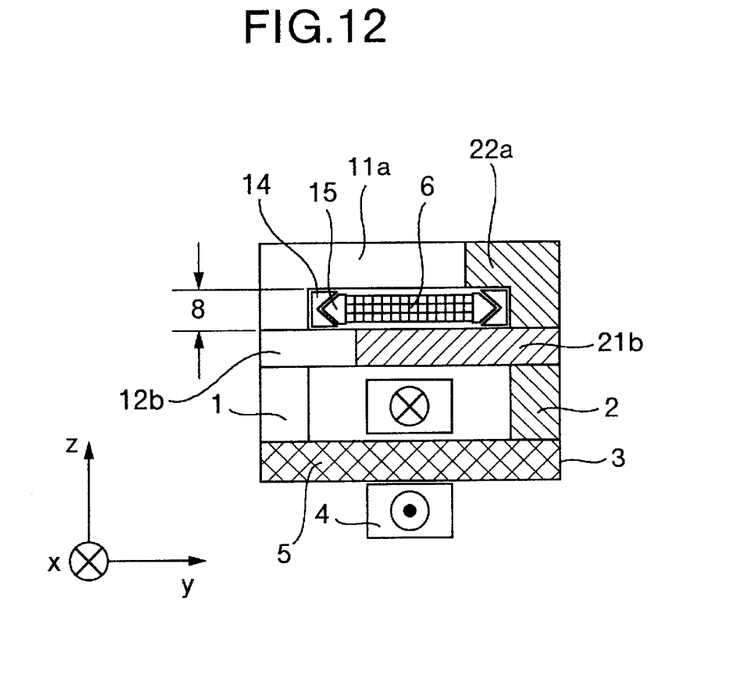
FIG. 12 is a cross sectional view of a linear motor in accordance with an embodiment of the present invention.

FIG. 12 shows a cross sectional view of the linear motor in accordance with the embodiment of the present invention. In FIG. 12, a support mechanism 14 is provided in a side of the armature 3, and a support mechanism 15 is provided in a side of the movable element 6, thereby supporting the relatively moving movable element 6. Accordingly, the movable element 6 is supported by the support mechanisms 14 and 15 and relatively moves through a gap 8 so as to pass through a tunnel.

Figure 16:
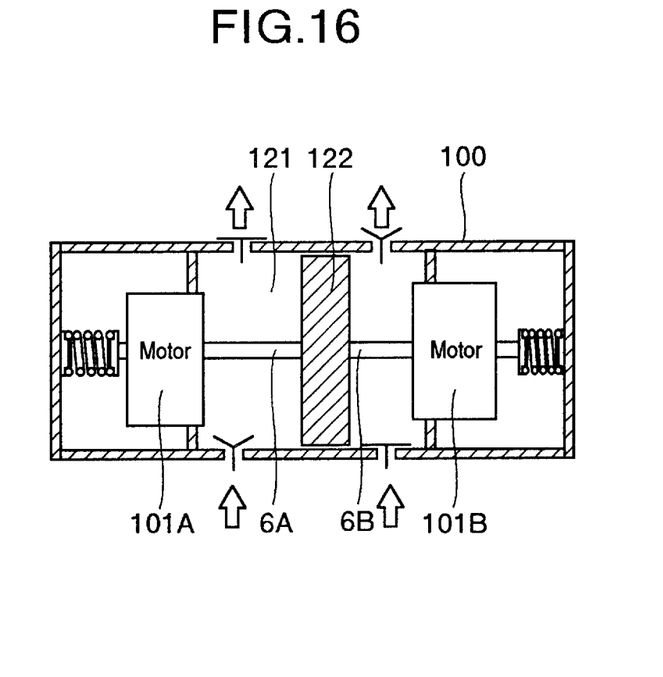
FIG. 16 is a schematic view showing a second structure of the linear motor and the piston in accordance with the other embodiment of the present invention.

FIG. 16 shows the other embodiment of a fluid transfer apparatus having a linear motor using linear motors 101 (101A and 101B) in both sides of the piston 122. Even in the case that a plurality of linear motors are arranged as shown in FIG. 16, it is possible to employ a structure in which the piston 122 is arranged between the phase A of the armature and the phase B of the armature shown in FIG. 8. The structure may be made such that the linear motor 101A is constructed as the armature A phase and the linear motor 101B is constructed as the armature B phase.

In FIG. 16, a description will be given in detail of a structure in which two linear motors 101A and 101B are respectively constructed as the armature A phase and the armature B phase.

The structure may be made such that the armature A phase and the armature B phase are arranged in series so that a pitch between the magnetic pole teeth in the armature A phase and the magnetic pole teeth in the armature B phase satisfies a relation {(k·P; k=0, 1, 2,)}, and the centers of magnetic poles in the movable element 6A and the movable element 6B satisfies a formula (k·P+P/M). In this case, reference symbol M is a number of phase.

In other words, the movable element 6A and the movable element 6B are shifted at (k·P+P/M) pitch so as to be integrally formed with the piston 122. Relatively, the structure may be made such that the magnetic pole pitches of the movable elements 6A and 6B are set to be the same pitch and the centers of the magnetic poles in the armature A phase and the armature B phase are (k·P+P/M) pitch shifted.

When exciting the coils of the armature A phase and the armature B phase so that a moving magnetic field is alternately generated, a magnetic flux flows in an opposite direction at every pole pitches in the gap 8 between the upper magnetic pole surface and the lower magnetic pole surface, a propelling force is generated in accordance with P/2 essential for moving, the movable element 6 relatively moves, and the piston 122 connected to the movable element freely moves.

Figure 17:
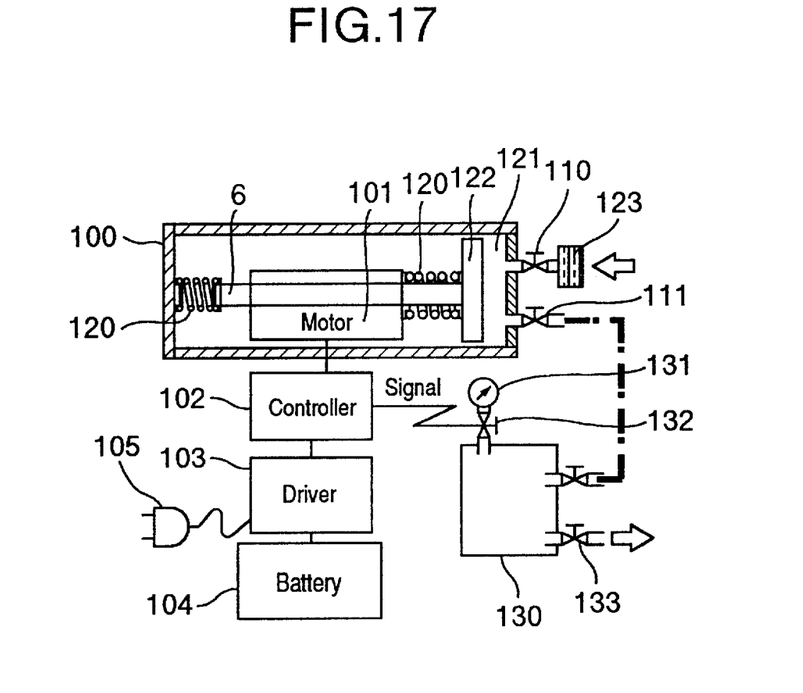
FIG. 17 is a schematic view showing a third structure of the linear motor and the piston in accordance with the other embodiment of the present invention.

FIG. 17 shows the other embodiment in accordance with the present invention in a fluid transfer apparatus with a linear motor. In FIG. 17, reference numeral 123 denotes a filter, reference numeral 130 denotes a tank, reference numeral 131 denotes a meter, reference numeral 132 denotes a safety valve, and reference numeral 133 denotes a discharge valve provided in the tank 130. Further, it is possible to link a signal of the meter 131 with the controller 102 so as to perform an appropriate control. Springs 120 shown in FIG. 17 may be arranged in front of and at the back of the linear motor 101, or one of them may be arranged. In FIG. 17, the same reference numerals show the same elements of the corresponding elements.

Figure 18:
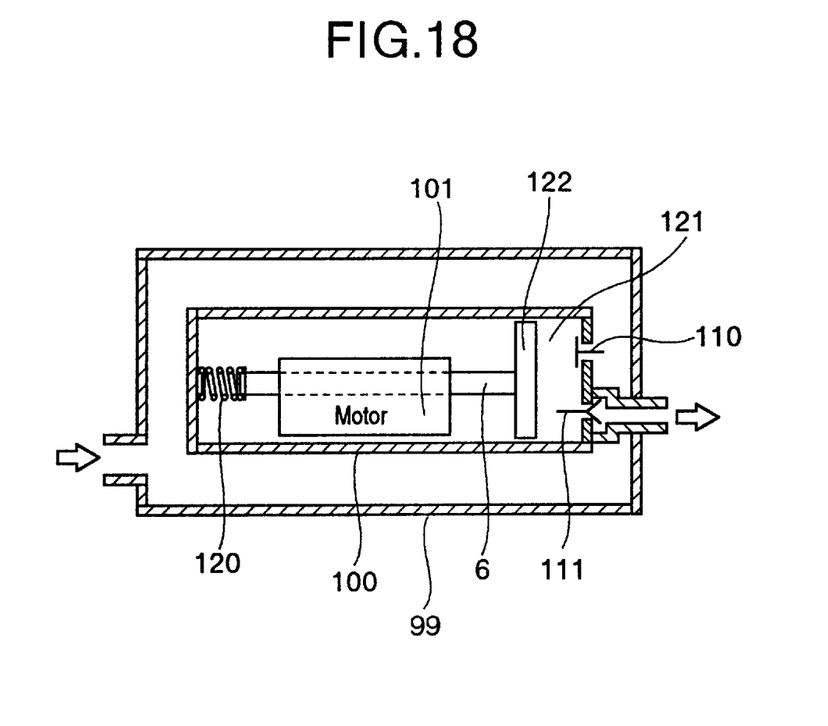
FIG. 18 is a schematic view showing a fourth structure of the linear motor and the piston in accordance with the other embodiment of the present invention.

FIG. 18 shows the other embodiment in accordance with the present invention in the fluid transfer apparatus with the linear motor. In FIG. 18, the fluid transfer apparatus with the linear motor is structured such that a casing 99 and a casing 100 are formed in a double construction, thereby achieving a cooling function for cooling the linear motor due to the fluid transfer. That is, the structure is made such that the casing 100 is cooled by the fluid.

Figure 19:
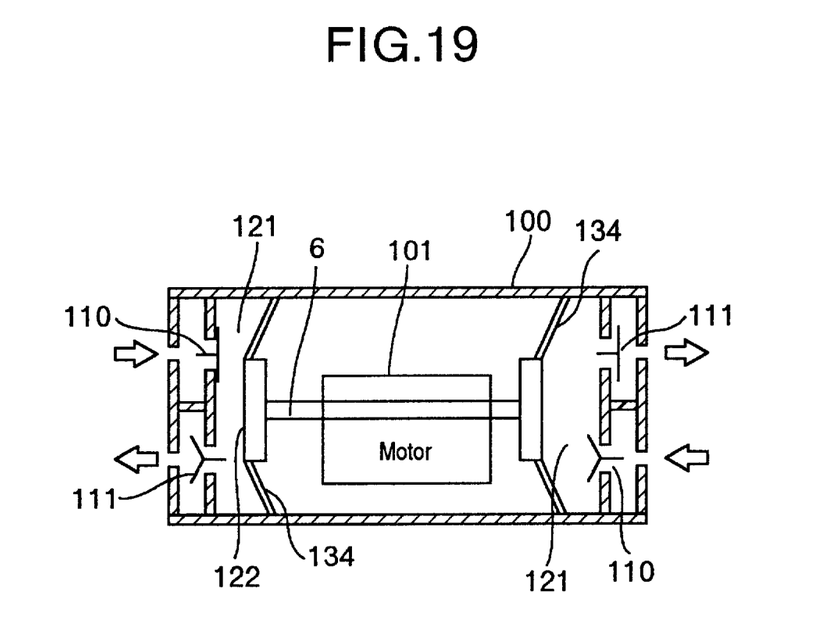
FIG. 19 is a schematic view showing a fifth structure of the linear motor and the piston in accordance with the other embodiment of the present invention.

FIG. 19 shows the other embodiment in accordance with the present invention in the fluid transfer apparatus with the linear motor. In FIG. 19, the structure is made such that an elastic body 134 is provided between the piston 122 and the casing 100. Further, the elastic body 134 provides a sealing effect. In FIG. 19, the structure mentioned above is provided in both ends of the linear motor 101. Accordingly, two pistons 122 are driven.

As mentioned above, the linear motor can improve a motor efficiency and can achieve a high output by shortening a magnetic path of the magnetic circuit for an effective magnetic flux and reducing a leakage flux of the magnetic pole teeth.

Further, in the linear motor in accordance with the present embodiment, since the attraction force applied to the movable element 6 and the upper magnetic pole teeth and the attraction force applied to the movable element 6 and the lower magnetic pole teeth have the same magnitude, and the attraction forces are applied in the opposite directions, the whole attraction force becomes small. Accordingly, it is possible to make the attraction force between the magnetic pole teeth of the movable element 6 and the armature 3 small, and it is possible to reduce a load of the support mechanism.

Further, it is possible to reduce the number of the parts and it is possible to make the fluid transfer apparatus thin.

In accordance with the present invention, it is possible to provide a fluid transfer apparatus which can improve an efficiency of the motor and can achieve a high output.

What is claimed is:

1. A fluid transfer apparatus for transferring a working fluid in accordance with an oscillating movement, having a linear motor, a suction valve to permit said working fluid to enter said fluid transfer apparatus and a discharge valve to permit said working fluid to exit said fluid transfer apparatus, wherein said linear motor of said fluid transfer apparatus comprises a movable element having magnets and to which a piston is attached, and an armature wherein upper magnetic pole teeth of said armature are disposed in the upper direction with respect to said movable element and lower magnetic pole teeth of said armature are disposed in the lower direction with respect to said movable element and said upper magnetic pole teeth and said lower magnetic pole teeth oppose to each other via the movable element, and a coil exciting so that adjacent magnetic pole teeth among the magnetic pole teeth form different magnetic poles and opposing magnetic pole teeth among the magnetic pole teeth form different magnetic poles, wherein said linear motor is constituted by said movable element, wherein said movable element is oscillated by exciting said coil in accordance with a redetermined control circuit, and wherein a fluid transfer is performed by said piston in a process of said oscillating movement.

2. A fluid transfer apparatus as claimed in claim 1, wherein an oscillating stroke of said piston is changeable.

3. A fluid transfer apparatus as claimed in claim 1, wherein said fluid transfer apparatus stops said piston at a predetermined position when a drive power source stops supplying.

4. A fluid transfer apparatus as claimed in claim 1, further comprising a resonance spring.

5. A fluid transfer apparatus, for transferring a working fluid in accordance with an oscillating movement having a linear motor, al suction valve to permit said working fluid to enter said fluid transfer apparatus and a discharge valve to permit said working fluid to exit said fluid transfer apparatus, said linear motor comprising an armature formed by a magnetic body, a coil wound around said armature, and a movable element capable of moving relative to said armature by being applied to a magnetic field generated by said armature, wherein said linear motor further has one magnetic pole teeth rows which are magnetically connected to one magnetic pole of said armature and are arranged so as to be separated into a first stage and a second stage in a substantially vertical direction to a moving direction of said movable element, and another magnetic pole teeth rows which are magnetically connected to another magnetic pole of said movable element and are arranged so as to be separated into a first stage and a second stage in a substantially vertical direction to the moving direction of said movable element, the first stage of magnetic pole teeth in said one magnetic pole teeth rows and the first stage of magnetic pole teeth in said another magnetic pole teeth row and the first stage of magnetic pole teeth in said one magnetic pole teeth row are alternately arranged with respect to the moving direction of said movable element, the second stage of magnetic pole teeth in said one magnetic pole teeth row and the second stage of magnetic pole teeth in said another magnetic pole teeth row are alternately arranged with respect to the moving direction of said movable element, and said movable element is arranged between said one and another first stage of magnetic pole teeth rows and said one and another second stage of magnetic pole teeth rows, and wherein a piston is attached to a front end of said movable element, and an operation of the piston is performed during an oscillating movement of said movable element.

6. A fluid transfer apparatus to transfer a working fluid in accordance with an oscillating movement, having a linear motor, a suction valve to permit fluid to enter the fluid transfer apparatus and discharge valve to permit fluid to exit the fluid transfer apparatus, wherein said linear motor comprises an armature and a movable element, wherein said armature includes a first core part having a first opposite portion opposed to each other through a first gap and a second core part having a second opposite portion opposed to each other through a second gap, and said first core part and said second core part include a common coil, and the magnetic polarity of said first opposite portion and the magnetic polarity of said second opposite portion are different, and said first core part and said second core part are disposed alternately, and said movable element is disposed in said first gap and said second gap, and wherein a piston to transfer fluid is attached to said movable element.

* * * * *